US011597505B1

(12) United States Patent
Hinman et al.

(10) Patent No.: US 11,597,505 B1
(45) Date of Patent: Mar. 7, 2023

(54) ROTORCRAFT OPTIMIZED FOR FORWARD FLIGHT

(71) Applicant: SiFly Aviation, Inc., Carmel Valley, CA (US)

(72) Inventors: Brian L. Hinman, Los Gatos, CA (US); Phil Frank, Seattle, WA (US)

(73) Assignee: SiFly Aviation, Inc., Carmel Valley, CA (US)

( * ) Notice: Subject to any disclaimer, the term of this patent is extended or adjusted under 35 U.S.C. 154(b) by 339 days.

(21) Appl. No.: 16/860,370

(22) Filed: Apr. 28, 2020

Related U.S. Application Data

(60) Provisional application No. 62/855,611, filed on May 31, 2019.

(51) Int. Cl.
*B64C 27/26* (2006.01)

(52) U.S. Cl.
CPC ..................... *B64C 27/26* (2013.01)

(58) Field of Classification Search
CPC ......... B64C 27/08; B64C 27/26; B64C 27/20; B64C 29/0033; B64C 2201/088
See application file for complete search history.

(56) References Cited

U.S. PATENT DOCUMENTS

| | | | | |
|---|---|---|---|---|
| 10,364,024 B2 * | 7/2019 | Tighe | .................... | B64C 27/08 |
| 10,518,875 B2 * | 12/2019 | Judas | .................. | B64C 29/0033 |
| 10,577,091 B2 * | 3/2020 | Parks | .................... | B64D 27/24 |
| 11,130,566 B2 * | 9/2021 | Mikic | .................... | B64C 39/06 |
| 2019/0127056 A1 * | 5/2019 | Weekes | .................. | B64C 39/12 |
| 2019/0144109 A1 * | 5/2019 | Ewing | ................ | B64C 29/0075 244/12.4 |
| 2019/0233083 A1 * | 8/2019 | Reichert | ............... | B64C 11/343 |
| 2020/0317332 A1 * | 10/2020 | Didey | .................... | B64C 39/08 |

* cited by examiner

*Primary Examiner* — Richard Green
*Assistant Examiner* — Arfan Y. Sinaki
(74) *Attorney, Agent, or Firm* — Sunstein LLP

(57) ABSTRACT

An improved rotorcraft of the type having a fuselage and a set of N≥4 rotors. The rotorcraft includes a structural support system affixed to the fuselage and mounting the set of rotors. The support system is configured as a set of airfoils that provide lift when the fuselage is in level flight. The fuselage has a central longitudinal axis that defines the direction of forward flight of the rotorcraft. Each of the rotors defines a corresponding rotational plane, that is tilted forward in the direction of the forward flight, when the central longitudinal axis of the fuselage is horizontal. Each airfoil may be positioned so that a majority of its length is disposed beneath the rotational plane of its corresponding rotor. When the rotorcraft is at a cruise speed, the airfoils are configured to provide lift that approximately matches the lift provided by the rotors.

10 Claims, 6 Drawing Sheets

ROTORCRAFT OPTIMIZED FOR FORWARD FLIGHT

PRIORITY

This application claims the benefit of U.S. Provisional Application No. 62/855,611, filed May 31, 2019, which is incorporated herein by reference in its entirety.

TECHNICAL FIELD

The present invention relates to rotorcraft, and more particularly to rotorcraft having at least four rotors.

BACKGROUND ART

Electric and autonomous technologies are revolutionizing the automotive industry, and the same trend has become apparent in the aviation industry. Vertical-take-off-and-landing (VTOL) aircraft serve a variety of needs, ranging from unmanned drone applications primarily in a hover state, to manned applications primarily in forward flight. Electric quad-copters have become pervasive for unmanned drone applications, and most of these applications require hovering or flying at a modest velocity. Optimized for slow-speed applications, quad-copter designs provide good hovering efficiency, but poor lift-to-drag ratio in high-speed forward flight.

While not widely known, the quad-copter aircraft configuration actually predates the classic helicopter design: a single main rotor with cyclic control, and a tail rotor to counteract the torque induced by the drag on the main rotor. The first quad-copter was constructed by Jacques Bregeut and Louis Bregeut in 1907. Their first prototype carried a single person as the pilot, and flew for approximately one minute. Surprisingly, this quad-copter flight occurred only four years after the Wright Brothers famous first flight. A second prototype was flown in multiple flights in 1908 and 1909. Control of the original quad-copters was challenging, as they were powered by a single gasoline engine, and there was neither cyclic (thrust direction) nor collective (thrust magnitude) pitch control of individual rotors. By 1921, Etienne Edmond Oehmichen had developed an improved quad-copter, which eventually flew over a course of one kilometer and carried two passengers. Despite the record flying success, the mechanical design was extremely complex, including additional smaller rotors for yaw and pitch control.

Long before the time when electronic fly-by-wire controls were technically feasible, the various levers to be adjusted by the pilot made controlled flight of a quad-copter challenging and impractical for general market acceptance. This gave rise to the classic helicopter design, with a pair of linkages for main-rotor cyclic (direction of thrust vector) control, a linkage for main-rotor collective (magnitude of thrust) control, and a fourth linkage for anti-torque (yaw) control. Igor Sikorsky was the first to develop a practical helicopter, connecting the pair of cyclic linkages to a central control stick to be held in the pilot's right hand, connecting the collective linkage to a lever held in the pilot's left hand, and connecting the anti-torque linkage to a pair of pedals on the floor to be operated with the pilot's feet. The mechanical simplicity of the Sikorsky design, in the absence of electronic control systems, allowed the design to achieve widespread market acceptance, almost erasing the memory of quad-copters being the first form of VTOL aircraft.

In the emerging field of electric aviation, the quad-copter is one of the simplest and most cost-effective electric VTOL configurations. Evidence to support this assertion is apparent with the availability of low-cost drones used by children as toys. The same basic quad-copter form also finds widespread use in commercial, industrial and military sectors. There are other configurations of "multi-copters" that have enjoyed some success, including designs with eight rotors, whereby counter-rotating rotors are sometimes stacked, forming what appears to be four rotors from above, other designs with six, eight, or more rotors, and even designs that include cyclic or collective control, similar to traditional helicopters. However, after more than a decade of drone development and availability, the basic quad-copter remains the predominant form of electric VTOL aircraft.

The basic configuration of a modern quad-copter consists of four electric motors, usually directly connected to two-bladed rotors, with a first pair of diagonally disposed rotors having similar direction of rotation, with a second pair of diagonally disposed rotors having the opposite direction of rotation. Some designs have transmissions between the motors and the rotors, allowing the motors to run at a higher rotational speed than the rotors so as to improve the power-to-weight ratio of the motors. These are less common in small drones, however, because of the increase in weight and cost. Similarly, rotors with more than two blades are sometimes used to reduce vibration and noise, though the benefits are usually outweighed by the cost increase. All commercially available quad-copters operate with angular velocity control of the rotors, in contrast with traditional helicopters that operate principally through pitch control.

Quad-copter drones leverage modern technology, including inertial sensors, low-power digital processors, lithium-ion batteries, and high-efficiency electric motors. Applying these technologies provides a means to automatically stabilize the quad-copter configuration, overcoming the challenges that faced engineers one hundred years ago. Quad-copter drones were first commercialized by companies such as DJI, founded in 2006. While the market has grown from almost zero to more than $10B per year, the predominance of applications requires either hover or slow-speed forward flight. Hence, the aerodynamic design of quad-copters has not been optimized to achieve good lift-to-drag ratio in high-speed flight. In fact, many engineers believe that high-speed drones will transition to new architectures, such as tilt-rotor configurations, to overcome the aerodynamic issues which they believe are inherent with quad-copters.

FIG. 1 is a McDonnell XHJB-1 side-by-side helicopter, in accordance with the prior art. In the 1940s, McDonnell Aircraft Corporation developed an experimental side-by-side helicopter called the XHJD-1. The aircraft had structural members that connect the two rotors to the fuselage, serving an augmented lifting role when in forward flight. At cruise speed, a portion of the lift comes from the rotors, and a portion of the lift comes from the wing-shaped structural members, thereby improving the lift-to-drag ratio relative to a similar design with just rotors and simple struts between the fuselage and rotors. While performance was quite good, the design was abandoned because of the mechanical complexity involved in gearing, shafting and control, as this was decades before fly-by-wire technologies were available.

The widely discussed architecture for electric VTOLs employs a tilt-rotor configuration, in which the lifting rotors are rotated from a position providing vertical thrust in hover, to a position providing forward thrust in cruise flight. Once in forward flight, most tilt-rotor designs include control surfaces in the wings to maintain aircraft attitude. The nacelles including the electric motors, optional gearboxes and rotors are "transitioned" over a period of a few seconds, utilizing an auxiliary mechanism such as a gear-reduced electric motor. This accommodation adds both complexity and cost, while reducing mechanical reliability. Moreover, tilt-rotors cannot transition back to the hovering state quickly enough in an emergency situation, such as a catastrophic loss of power. That necessitates landing a tilt-rotor as an airplane, with forward velocity throughout the landing process. In confined areas, such as for urban mobility applications, autorotative landings can be the difference between life and death.

The other architectures for high-speed drones, which have seen great popularity for long-range military applications, are considered "compound helicopters." In these designs, there are rotors for vertical lift, and separately rotors, propellers or jets for forward thrust (commonly "propulsors"). Comparing with tilt-rotor designs, compound helicopters add the cost of forward thrust propulsors rather than the cost of transition mechanisms to adjust the rotors from vertical lift to forward thrust. As with tilt-rotor designs, compound helicopters usually include control surfaces to direct the aircraft attitude, as the rotors are typically slowed or stopped entirely, thus losing their authority to maintain aircraft control. In theory, compound helicopters could land through auto-rotative descent, however most designs do not include pitch control.

SUMMARY OF THE EMBODIMENTS

In accordance with one embodiment of the invention, an improved rotorcraft of the type having a fuselage and a set of N rotors coupled to the fuselage, N≥4, wherein the improvement includes a structural support system affixed to the fuselage and mounting the set of rotors. Additionally, the support system is configured as a set of airfoils that provide lift when the fuselage is in level flight.

In a related embodiment, the set of airfoils is configured to provide lift, when the rotorcraft is at a cruise speed in level flight, in an amount that approximately matches an amount of lift provided by the set of rotors. Alternatively, or in addition, the fuselage has a central longitudinal axis that defines a direction of forward flight of the rotorcraft and each of the rotors defines a rotational plane $P_i$, i=1, 2 . . . N; in this further embodiment, the improvement further comprises mounting of each rotor by the support system wherein the corresponding rotational plane $P_i$, i=1, 2 . . . N, is tilted forward, in the direction of forward flight, by an angle $\varphi_i$, i=1, 2 . . . N, when the central longitudinal axis is horizontal, so that the rotorcraft is configured for forward flight.

Also optionally, the fuselage defines directions that are above and below the central longitudinal axis, and each of the airfoils has a length and is positioned so that a majority of the length of each airfoil is disposed beneath the rotational plane $P_i$, i=1, 2 . . . N of its corresponding rotor. As a further option, each rotor has a thrust that is adjustable by angular velocity control and also by pitch control. Also optionally, each rotor is electrically powered. Also optionally, the improvement further comprises mounting of each rotor by the support system wherein the corresponding rotational plane $P_i$, i=1, 2 . . . N, also includes a small dihedral tilt at an angle $\theta_i$, i=1, 2, . . . N, about an axis that is parallel to the central longitudinal axis.

In other embodiments, the support structure may be implemented in a wide array of shapes, for example, as four distinct support members, each member separately mounting one of the rotors to the fuselage. Alternatively, a Delta shape may be employed, for example. by joining the rotor pylons with a front-to-back rod to add strength, without much compromising aerodynamic drag.

DETAILED DESCRIPTION OF SPECIFIC EMBODIMENTS

Definitions

As used in this description and the accompanying claims, the following terms shall have the meanings indicated, unless the context otherwise requires:

A "set" includes at least one member.

A "cruise speed" of a rotorcraft means a speed of the rotorcraft under level flight conditions within 75% of a maximum sustainable speed of the rotorcraft.

As autonomous package delivery becomes commonplace, and drones will be tasked with flying over longer distances in high-speed forward flight, the basic configuration of drones will either change to address these new requirements, or the form of the traditional quad-copter should change to become more efficient and faster in forward flight. Similarly, if quad-copters are to scale for manned applications, with high-speed forward flight typically required, the form of the quad-copter must be optimized for these flight conditions.

Achieving good high-speed flight in a rotorcraft having four rotors is indeed possible and advantageous. For purposes of the present application, we call a rotorcraft, having four rotors, that is optimized for high-speed flight, an "optimized rotorcraft."

While impractical for a mechanical helicopter, the optimized rotorcraft in an embodiment of the present invention takes advantage of the augmented lifting principal first employed in the XHJD-1. While a tilt-rotor necessitates landing as an airplane, with forward velocity throughout the landing process, the optimized rotorcraft of this embodiment can land through autorotative descent, like a traditional helicopter. The optimized rotorcraft of this embodiment, unlike compound helicopters, includes pitch control. Moreover, the cost of the compound helicopters is inherently higher than that of the optimized rotorcraft of this embodiment due to the addition of separate propulsors for forward flight, and of control surfaces to maintain aircraft authority.

Figure 1:
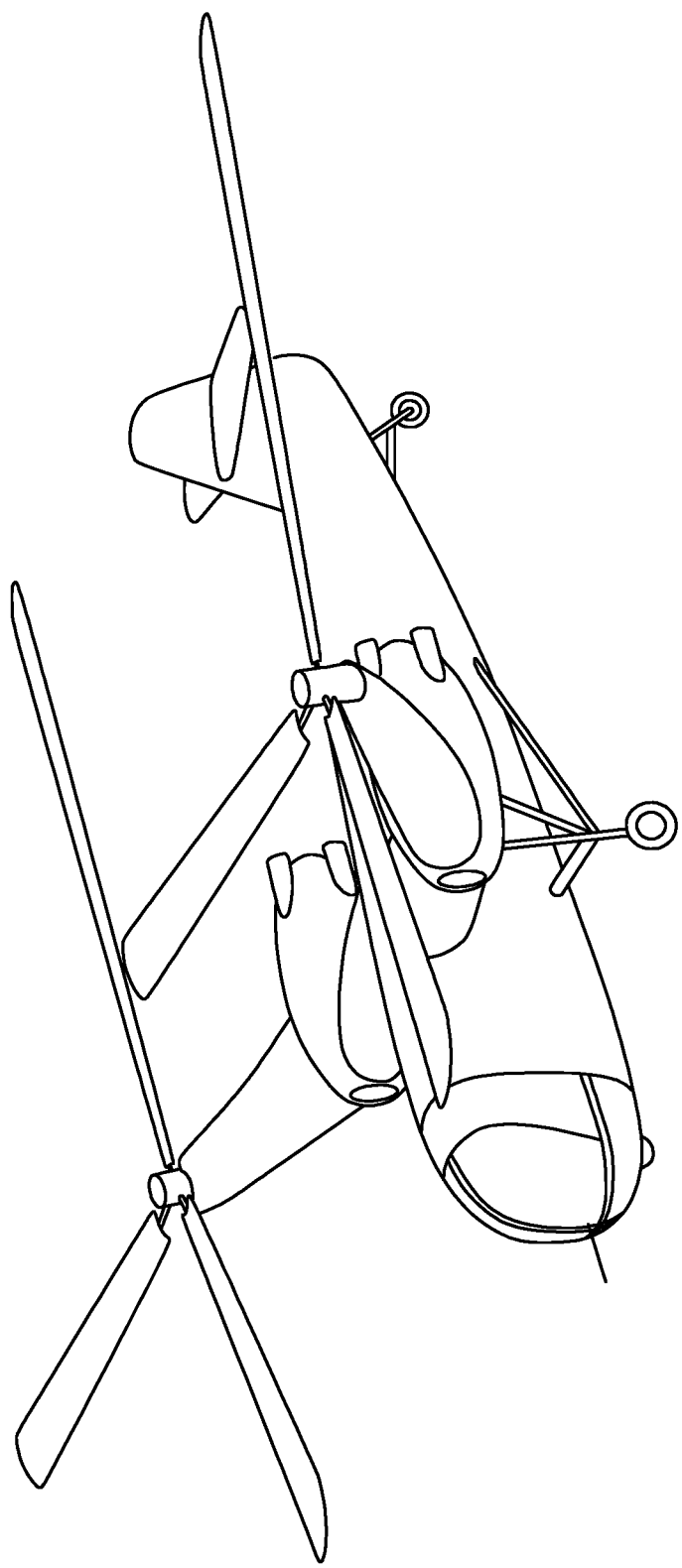
FIG. 1 is a McDonnell XHJB-1 side-by-side helicopter, in accordance with the prior art.
Figure 2:
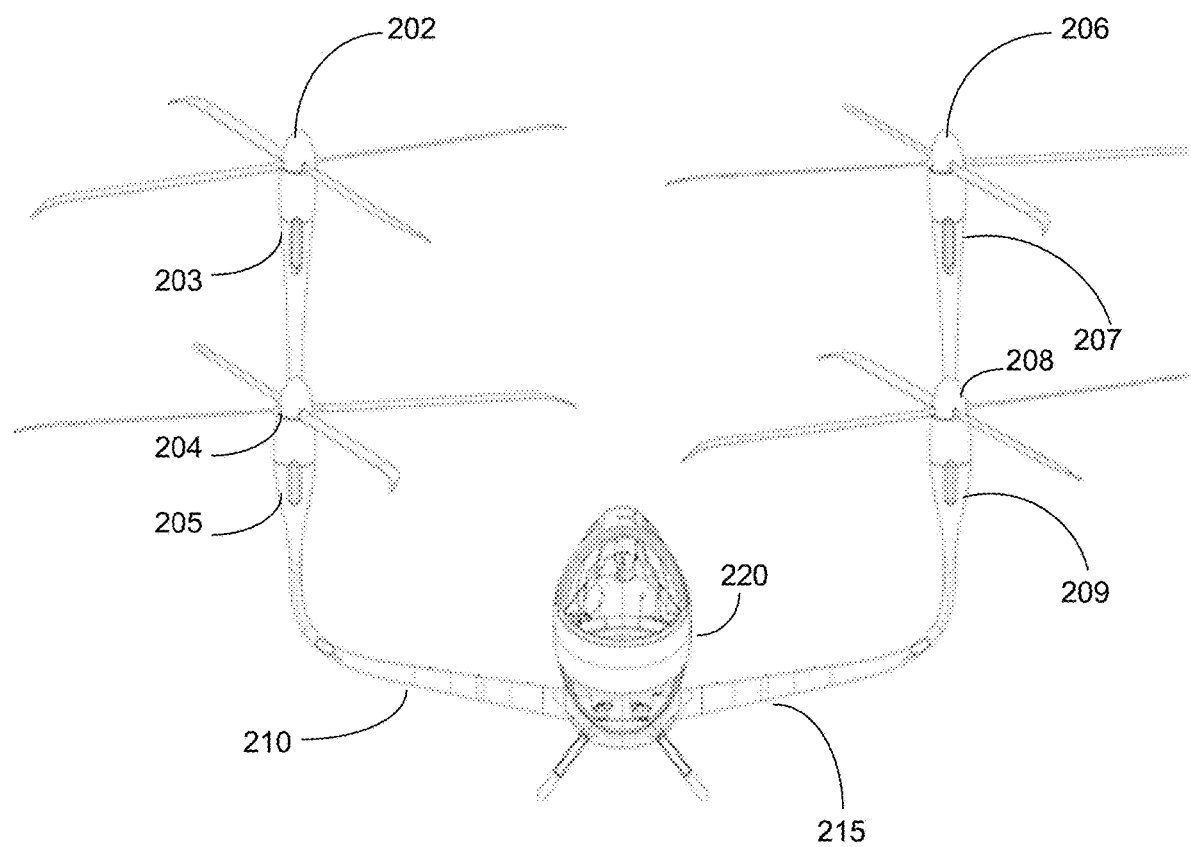
FIG. 2 is a front view of the optimized rotorcraft in accordance with an embodiment of the present invention.

FIG. 2 is a front view of the optimized rotorcraft in accordance with an embodiment of the present invention. In the embodiment of FIG. 2, the optimized rotorcraft has a structural support system that includes a first structural member 210 affixed to the right side of the fuselage 220, and a second structural member 215 affixed to the left side of the fuselage 220. The structural members 210, 215 are configured as airfoils that provide lift to the rotorcraft when the rotorcraft is in level flight. The first structural member 210 mounts a first set of rotors 202, 204 to the fuselage 220. The rotors 202, 204 are coupled to vertical surfaces 203, 205 that are shaped to minimize drag. The second structural member 215 mounts a second set of rotors 206, 208 to the fuselage 220. The rotors 206, 208 are coupled to vertical surfaces 207, 209 that are also shaped to minimize drag. The embodiment of the rotorcraft in FIG. 2 has four rotors 202, 204, 206, 208, whereas in other embodiments, the rotorcraft may have greater than four rotors. Each rotor 202, 204, 206, 208 may be electrically powered.

Figure 3:
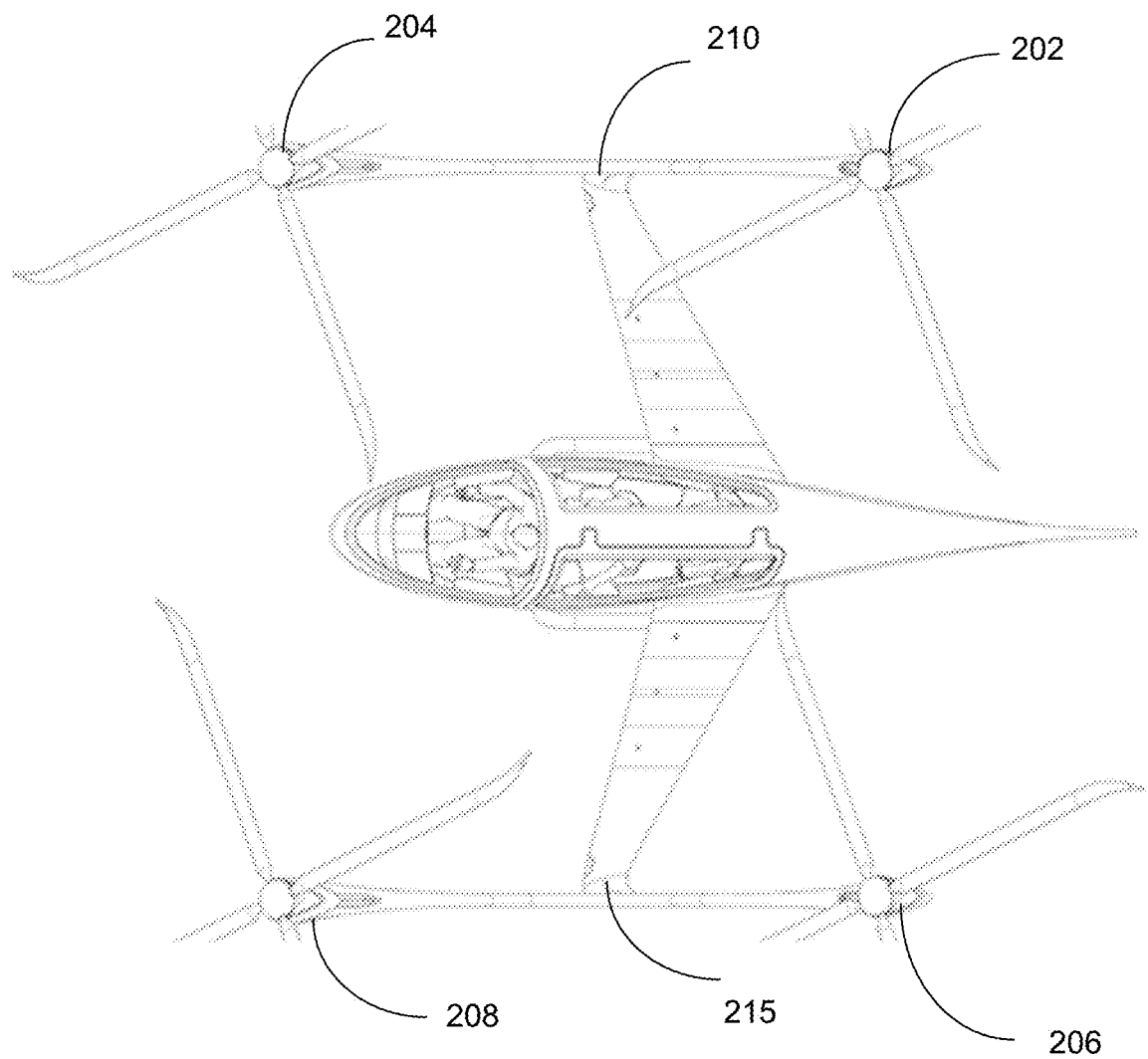
FIG. 3 is a top view of the optimized rotorcraft of FIG. 2.

FIG. 3 is a top view of the optimized rotorcraft of FIG. 2. FIG. 3 illustrates the first set of rotors 202, 204 mounted, via the first structural member 210, to the fuselage 220. Similarly, FIG. 3 shows the second set of rotors 206, 208 mounted, via the second structural member 215, to the fuselage 220.

Figure 4:
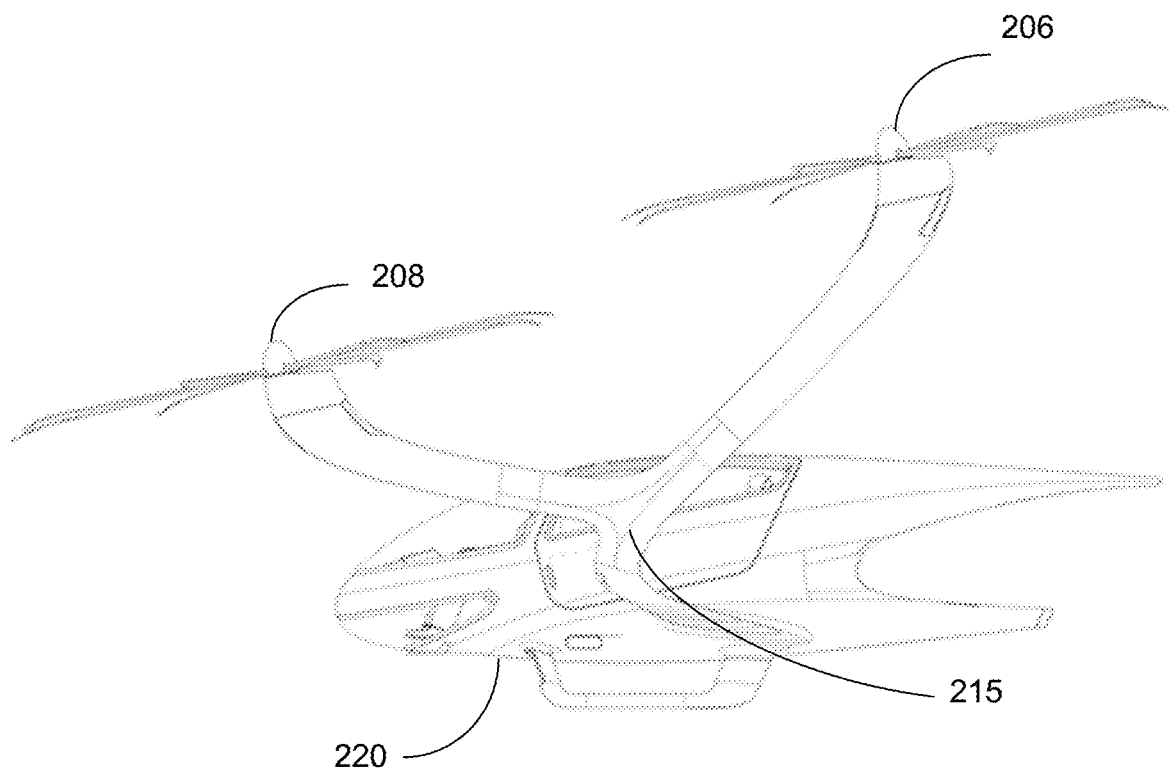
FIG. 4 is a left side view of an optimized rotorcraft of FIG. 2.

FIG. 4 is a left side view of an optimized rotorcraft of FIG. 2. FIG. 4 illustrates the affixation of the second structural member 215 to the fuselage 220.

Figure 5:
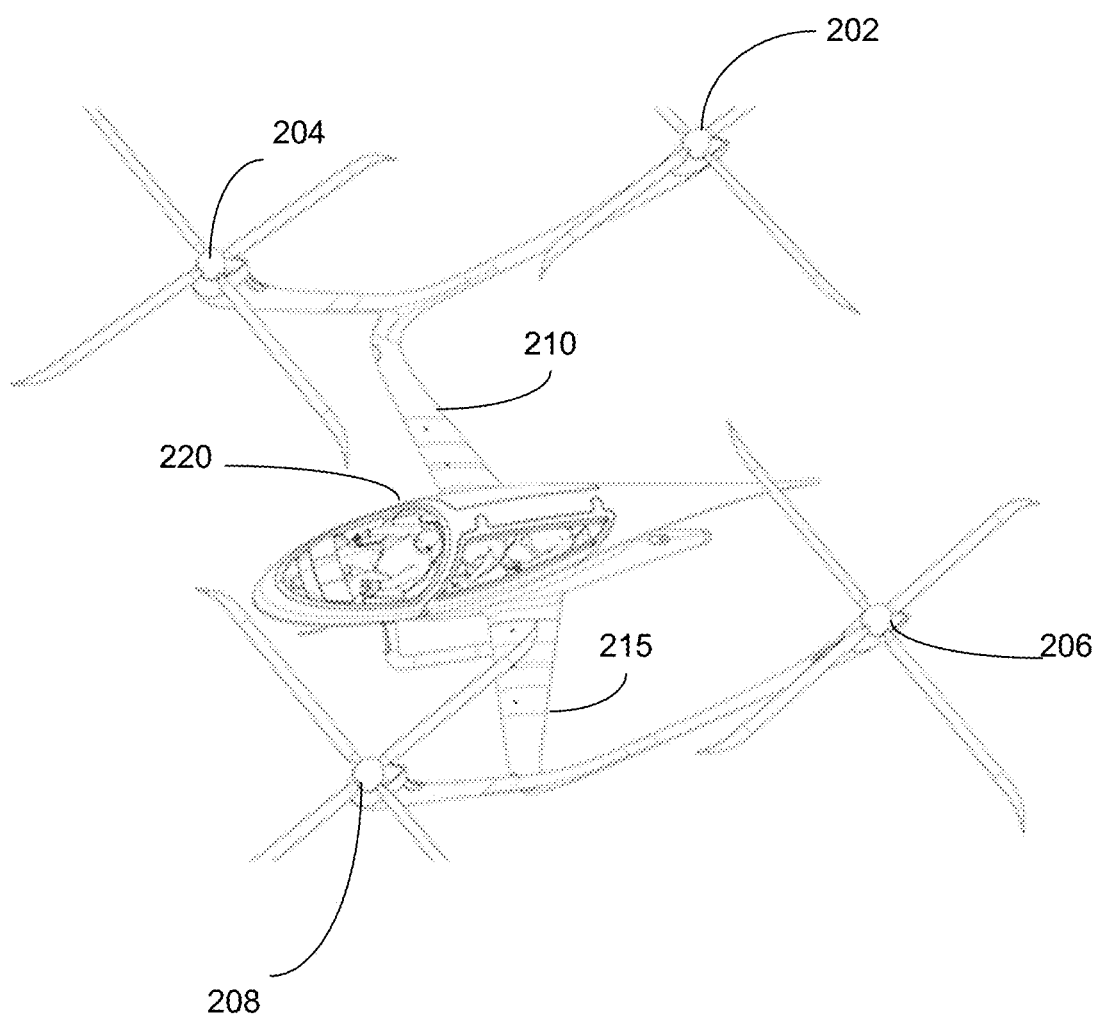
FIG. 5 is a top view of the optimized rotorcraft of FIG. 2, in flight, in accordance with an embodiment of the present invention.

FIG. 5 is a top view of the optimized rotorcraft of FIG. 2, in flight, in accordance with an embodiment of the present invention. As shown in FIG. 5, the fuselage 220 has a central longitudinal axis that defines the direction of forward flight of the rotorcraft. The fuselage 220 also defines directions that are above and below the central longitudinal axis of the fuselage 220.

As also shown in FIG. 5, each of the rotors 202, 204, 206, 208 defines a corresponding rotational plane that is tilted forward in the direction of forward flight by an angle, when the central longitudinal axis is horizontal. The rotational plane of a rotor may also include a dihedral tilt at an angle about an axis that is parallel to the central longitudinal axis. Each of the structural members 210, 215 has a length and is positioned so that a majority of its length is disposed beneath the rotational plane of its corresponding ones of the rotors 202, 204, 206, 208. The structural members 210, 215 are configured to provide lift, when the rotorcraft is at a cruise speed in level flight, in an amount that approximately matches an amount of lift provided by the rotors 202, 204, 206, 208.

Figure 6:
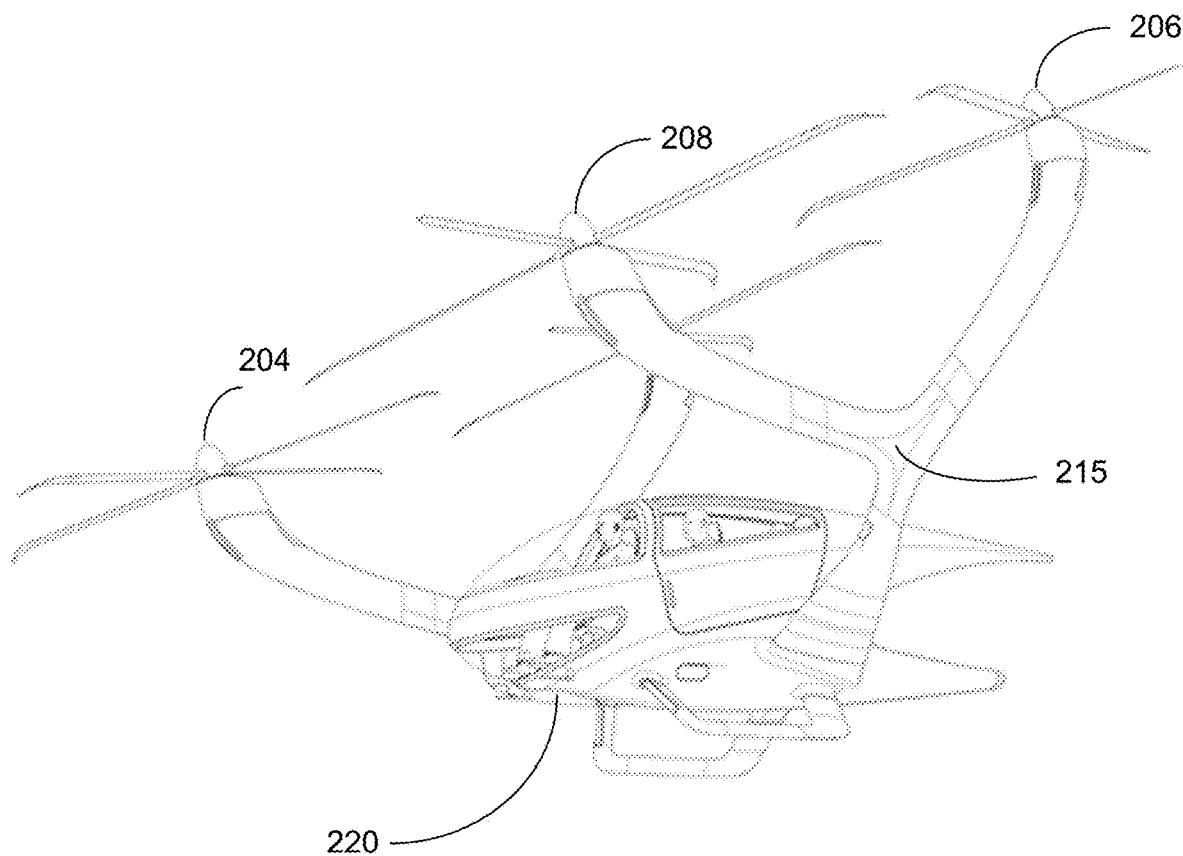
FIG. 6 is a side view of the optimized rotorcraft of FIG. 2, in flight, in accordance with an embodiment of the present invention.

FIG. 6 is a side view of the optimized rotorcraft of FIG. 2, in flight, in accordance with an embodiment of the present invention.

Four architectural changes are made to create the optimized rotorcraft of FIG. 2 from the typical quad-copter configuration:

(1) The plane of each of the rotors 202, 204, 206, 208 is tilted in the direction of forward flight, whereas the central axis through the fuselage 220 is aligned with the direction of forward flight, or tilted slightly upward to provide positive lift. While, in some embodiments, the four rotors 202, 204, 206, 208 may be co-planar, in other embodiments the rotors 202, 204, 206, 208 are tilted slightly toward one another, typically less than 4 degrees, to create a dihedral effect similar to that employed for airplane design. The dihedral improves aircraft stability, even with inertially controlled systems such as a quad-copter. Whether dihedral is employed or not, the predominant average orientation of the plane of each rotor 202, 204, 206, 208 is tilted forward in accordance with the anticipated lift-to-drag ratio in forward flight.

(2) Taking advantage of the fuselage 220 being aligned with forward flight, the aerodynamic design of the optimized rotorcraft of FIG. 2 minimizes drag, while providing zero to positive lift in forward flight conditions. This is in contrast to traditional quad-copter designs, whereas the fuselage has a downward tilt in forward flight, causing excessive drag and negative lift.

(3) In the optimized rotorcraft of FIG. 2, the structural members 210, 215 that connect the rotors 202, 204, 206, 208 to the fuselage 220 are designed to minimize drag, while providing positive lift in forward flight. While not required, the preferred embodiment employs a vertical displacement between the lifting portion of the structural members 210, 215 and the rotors 202, 204, 206, 208, for example by having the attachment point of the structural members 210, 215 be at the lower portion of the fuselage 220, arching upward to support the rotors 202, 204, 206, 208 above. The vertical displacement between the rotors 202, 204, 206, 208 and structural members 210, 215 minimizes the impact of the structural members 210, 215 on rotor efficiency, while at the same time avoiding rotor downwash on the lifting surfaces, which would negate some portion of the lift otherwise possible from the structural members 210, 215. In combination, the rotors 202, 204, 206, 208 and structural members 210, 215 act much like a bi-plane, with the lifting effect split between the rotors 202, 204, 206, 208 above, and the structural members 210, 215 below.

(4) The thrust of the four rotors 202, 204, 206, 208 is adjusted through a combination of both angular velocity control, including revolutions per minute (RPM) control, and pitch control. While RPM control is typically the only means to adjust thrust in traditional quad copters, pitch control allows the efficiency to be optimized, and noise to be minimized, throughout various flight conditions. Moreover, pitch control allows the optimized rotorcraft to land in an emergency situation through auto-rotative descent, a key safety feature of traditional single-rotor helicopters.

To illustrate an example design of an optimized rotorcraft embodiment utilizing these principles, we consider a three-person optimized rotorcraft with a targeted gross take-off weight of 2,700 lbs. We begin by requiring excellent hovering efficiency, which basic momentum theory mandates low Disk Loading (DL). DL is defined as the aircraft weight divided by the total swept area of the rotors. As Gessow demonstrated in "Aerodynamics of the Helicopter," the lifting efficiency of a helicopter can be approximated as:

$$PL = 38 M 1/\sqrt{DL}$$

PL is the power loading, in pounds of weight that can be lifted per horsepower applied to the rotor(s). M is the merit factor of the rotor, which is typically 75% to 80% for a well-designed modern rotor. DL in this equation is defined as pounds per square foot of swept area.

In practice, helicopters with a DL of about 3 lbs/ft$^2$ have excellent hovering efficiency, while at the same time having adequate power to deal with wind gust conditions. We establish the DL for the optimized rotorcraft at this level. Dividing the weight of the aircraft across four equally sized rotors, we find that the rotor diameter would be 16.9 ft. Presuming a rotor merit factor M of 78%, the PL will be 17.1 lbs/hp. Thus, the power necessary to hover the aircraft (out of ground effect), while at the maximum gross weight of 2,700 lbs., is 158 hp (118 kW).

To determine the projected wing area required from the structural members, we establish an estimate of the cruise velocity, and the percentage of the aircraft weight to be lifted by the structural members at the cruise speed. With a goal of minimizing mechanical complexity, we do not want to add control surfaces to the wings, but rather have the RPM and pitch of the rotors maintain authority of the aircraft attitude throughout all phases of flight. Toward this goal, we set a target of 50% of the lift coming from the structural members at cruise speed, while estimating a cruise velocity of 120 knots. As aircraft designers have practiced for many years, the estimate of the cruise velocity is established through an estimate of the aerodynamic drag. However, the aerodynamic drag is not fully determined without knowledge of the wing area. Thus, there is an iterative process to converge upon the actual cruise velocity and wing area. Referring to the standard lift equation:

$$L = C_L V^2 \rho / 2S$$

Lift (L) is equal to the Coefficient of Lift ($C_L$), times the square of the aircraft Velocity (V), times one-half the density of air ($\rho$), times the projected wing area (S). For the example optimized rotorcraft, we have selected the Roncz low-drag airfoil (Marske7-il), which has a $C_L$ of 0.8 with an angle-of-attack of 5 degrees. This dictates a total wing area of about 32 square feet, to develop a lift of 1,350 lbs at a cruise velocity of 120 knots and a 5-degree angle-of-attack. The 5-degree angle-of-attack is ideal for this particular airfoil, because it maximizes the lift-to-drag ratio.

The wings are mounted to the lower area of the fuselage, which on the one hand requires more material and strength compared to mounting at the upper area of the fuselage, while on the other hand provides vertical separation between the rotors and the wings. The vertical separation is designed so that the flow of the front rotors does not impinge upon the wings, including the rear wings, at cruise velocity. This improves the efficiency of both the rotors and wings, which more than offsets the additional weight required. The upper and lower lifting surfaces, including the desired separation, makes the aerodynamic design reminiscent of the classic biplane.

The aerodynamic drag equation has a similar form to the lift equation:

$$D = C_D A \tfrac{1}{2} \rho V^2$$

where the drag force (D) is equal to the coefficient of drag ($C_D$) times the frontal area of the aircraft (A), times half the density of the air ($\rho$), times the square of the aircraft velocity (V). In practice, the various components of the aircraft are analyzed separately, and the sum of the drag forces becomes the total aircraft drag. Wayne Johnson at NASA has provided guidelines for analyzing aerodynamic drag for various aircraft, including quad copters. Using these guidelines, the total estimated drag force for the example optimized rotorcraft will be 287 lbf at the baseline cruise velocity of 120 knots. Having established a desired rotor lift of 1,350 lbf at cruise velocity, therefore the desired tilt angle of the average rotor plane is arctan(287/1350), which is 12 degrees. This results in a total rotor thrust vector of 1,380 lbf, with a 287 lbf contribution toward forward thrust, and a 1,350 lbf contribution toward vertical lift.

Several researchers have commented upon the loss of efficiency of the rear rotors relative to the front rotors, for a quad-copter in forward flight. The reason for this is the increase of inflow velocity of the rear rotors due to the induced velocity of the front rotors, in combination with the angular contribution of the forward velocity of the aircraft. To somewhat counteract this effect, the rear rotors in the preferred embodiment are lifted relative to the front rotors, such that the rear rotors encounter air that has not been "pre-accelerated" by the front rotors. In the preferred embodiment of the optimized rotorcraft, the thrust of each rotor will be adjusted through both RPM control, as with a standard quad-copter, and also through pitch control, as with a standard helicopter. In forward flight, as an example, the front rotor pitch might increase from 8 degrees in hover to 10 degrees at cruise velocity, while the rear rotor pitch might increase from 8 degrees in hover to 14 degrees at cruise velocity. The adjustments in pitch are made as phases of flight, on a relatively slow scale, while adjustments in rotor RPM will occur at roughly 100 mS intervals, so as to maintain aircraft attitude. Using RPM control on the faster scale has no impact on mechanical reliability, since this is a function of an electronic motor controller, while the mechanism for pitch control involves friction and wear, and is thus adjusted less frequently.

In the example optimized rotorcraft (FIGS. 2-6), the lift-to-drag ratio in forward flight is 2,700 lbs:287 lbs=9.4:1, while the (out-of-ground-effect) hover power loading is 17.1 lbs/hp. Thus, the hover and forward flight performance are excellent, while the design of the aircraft is quite simple.

Results and Advantages. Traditional helicopters have a lift-to-drag ratio of about 4.5:1 at a cruise speed of 120 kts. A typical quad-copter could have a lift-to-drag ratio even worse than this, depending upon the shape of the fuselage and structural members. In the optimized rotorcraft, the augmented lift of the structural members, and optionally the fuselage, allows a lift-to-drag ratio of 9.0:1 or better at 120 kts. This improvement is critically important in the early years of electric VTOLs, as energy density of Lithium-ion batteries limits the flight endurance and distance. The improvement in lift-to-drag ratio comes with minimal cost impact relative to a typical quad-copter that has not been optimized for forward flight. Moreover, the hovering performance of the optimized rotorcraft is not materially compromised relative to a typical quad-copter.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A rotorcraft comprising
a fuselage;
a set of N rotors coupled to the fuselage, N≥4, such rotors constituting a sole means of propulsion of the aircraft, each rotor having an axis of rotation that is fixed relative to the fuselage; and
a structural support system affixed to and projecting from the fuselage, the support system including a set of airfoils that provide lift when the fuselage is in level flight, each such airfoil being devoid of any control surface;
the structural support system including N apexes on each of which is mounted a distinct one of the rotors of the set, with each apex being fashioned so that a plane of rotation of the distinct one of the rotors mounted thereon is above its adjacent airfoil.

2. A rotorcraft according to claim 1, wherein the set of airfoils is configured to provide lift, when the rotorcraft is at a cruise speed in level flight, in an amount that approximately matches an amount of lift provided by the set of rotors.

3. A rotorcraft according to claim 1, wherein the fuselage has a central longitudinal axis that defines a direction of forward flight of the rotorcraft and each of the rotors defines a rotational plane $P_i$, i=1, 2 . . . N, and each rotor is mounted on the support system wherein the corresponding rotational plane $P_i$, i=1, 2 . . . N, is tilted forward, in the direction of forward flight, by an angle $\phi_i$, i=1, 2 ... N, when the central longitudinal axis is horizontal, so that the rotorcraft is configured for forward flight.

4. A rotorcraft according to claim 3, wherein the fuselage defines directions that are above and below the central longitudinal axis, and each of the airfoils has a length and is positioned so that a majority of the length of each airfoil is disposed beneath the rotational plane $P_i$, i=1, 2 ... N of its adjacent rotor.

5. A rotorcraft according to claim 1, wherein each rotor has a thrust that is adjustable by angular velocity control and also by pitch control.

6. A rotorcraft according to claim 1, wherein each rotor is electrically powered.

7. A rotorcraft according to claim 3, wherein each rotor is mounted on the support system in a manner wherein the corresponding rotational plane $P_i$, i=1, 2 ... N, also includes a dihedral tilt at an angle $\theta_i$, i=1, 2, ... N, wherein $\theta_i$ is less than 4 degrees, about an axis that is parallel to the central longitudinal axis.

8. A rotorcraft according to claim 1, wherein the structural support system is affixed at a lower portion of the fuselage and the structural support system is configured to arc upward as it projects from the fuselage to support the set of rotors.

9. A rotorcraft according to claim 1, wherein the set of N rotors is configured as a subset of front rotors and a subset of rear rotors and the structural support system are configured to mount the set of rear rotors relative to the set of front rotors so that the rotational planes of set of rear rotors lie above the rotational planes of the set of front rotors.

10. A rotorcraft according to claim 1, wherein the rotorcraft is configured to provide low disk loading.

* * * * *